United States Patent
Kumar et al.

(10) Patent No.: US 11,423,065 B2
(45) Date of Patent: Aug. 23, 2022

(54) DATA INDEXING SYSTEM USING DYNAMIC TAGS

(71) Applicant: AMERICAN EXPRESS TRAVEL RELATED SERVICES COMPANY, INC., New York, NY (US)

(72) Inventors: Ashish Kumar, Bengaluru (IN); Yousef Mofidi, Polegate (GB); Ruchika Panesar, Gurgaon (IN); Dhruv Navinchandra Shah, Bengaluru (IN); Jaskirat Singh, Bengaluru (IN)

(73) Assignee: American Express Travel Related Services Company, Inc., New York, NY (US)

( * ) Notice: Subject to any disclaimer, the term of this patent is extended or adjusted under 35 U.S.C. 154(b) by 151 days.

(21) Appl. No.: 16/443,511

(22) Filed: Jun. 17, 2019

(65) Prior Publication Data

US 2020/0342014 A1    Oct. 29, 2020

(30) Foreign Application Priority Data

Apr. 29, 2019 (IN) .............................. 201911016900

(51) Int. Cl.
*G06F 16/332* (2019.01)
*G06F 16/338* (2019.01)
*G06F 16/335* (2019.01)
*G06F 16/33* (2019.01)

(52) U.S. Cl.
CPC ........ *G06F 16/3323* (2019.01); *G06F 16/335* (2019.01); *G06F 16/338* (2019.01); *G06F 16/3334* (2019.01)

(58) Field of Classification Search
CPC .. G06F 16/3323; G06F 16/338; G06F 16/335; G06F 16/3334
See application file for complete search history.

(56) References Cited

U.S. PATENT DOCUMENTS

| | | | |
|---|---|---|---|
| 10,387,882 B2 * | 8/2019 | Hagen | G06Q 20/4016 |
| 2009/0287674 A1 * | 11/2009 | Bouillet | G06F 16/9562 |
| 2014/0075004 A1 * | 3/2014 | Van Dusen | H04L 41/04 709/223 |
| 2016/0162574 A1 * | 6/2016 | Gorodilov | G06F 16/338 707/722 |
| 2017/0075536 A1 * | 3/2017 | Cho | G06F 3/0482 |
| 2017/0103072 A1 * | 4/2017 | Yuen | G06F 16/58 |
| 2018/0276302 A1 * | 9/2018 | Talyansky | G06F 16/9535 |
| 2018/0349642 A1 * | 12/2018 | Sehgal | G06F 21/6254 |
| 2019/0129958 A1 * | 5/2019 | Liao | G06F 16/3326 |
| 2019/0392285 A1 * | 12/2019 | Manaharlal Kakkad | G06F 40/30 |

* cited by examiner

*Primary Examiner* — William B Partridge
*Assistant Examiner* — Aryan D Toughiry
(74) *Attorney, Agent, or Firm* — Thomas | Horstemeyer, LLP

(57) ABSTRACT

A data indexing system may use dynamic tags to increase findability and relativity of located datasets. The dynamic tags may be generated based on captured search log data. The system may calculate various parameters used to determine the findability and relativity of a given dataset. The system may calculate a dynamic tag score based on the calculated parameters. The system may store the dynamic tags and the associated dynamic tag score with the given dataset.

20 Claims, 4 Drawing Sheets

DATA INDEXING SYSTEM USING DYNAMIC TAGS

CROSS REFERENCE TO RELATED APPLICATIONS

This application claims priority to and the benefit of India Patent Application No. 201911016900 filed Apr. 29, 2019 and entitled "DATA INDEXING SYSTEM USING DYNAMIC TAGS," which is incorporated by reference herein in its entirety for all purposes.

FIELD

The disclosure generally relates to data indexing systems, and more specifically, to a data indexing system using dynamic tags to expand data searchability.

BACKGROUND

Data indexing systems may be used to provide search capabilities for various datasets. A technical problem is that unstructured datasets (e.g., datasets having a lack of definite identification tags) may downgrade search relativity and findability in typical data indexing systems. Typical data indexing systems may provide ordered search results by weighting the frequency of one or more search terms located in a given unstructured dataset. For example, in response to receiving the search term of "search," typical data indexing systems may retrieve datasets having the term "search," and order the search results based on which datasets have the highest frequency of the word "search." As a result, the data indexing system may not yield desired search results, and/or may not present search results in an accurate order of relativity. Resubmission of additional searches in response to the undesired search results may decrease computing efficiencies and increase processing and memory usage in the data indexing system.

SUMMARY

Systems, methods, and articles of manufacture (collectively, the "system") for generating dynamic tags are disclosed. The system may capture search log data comprising a search term and an accessed dataset identifier. The system may determine a dynamic tag based on the search term from the search log data. The system may calculate a custom term weightage ("C") parameter, an important term weightage ("I") parameter, and/or a topic based weightage ("T") parameter for the dynamic tag, wherein the C parameter, the I parameter, and the T parameter are calculated based on the search log data. The system may calculate a dynamic tag score based on at least one of the C parameter, the I parameter, or the T parameter, wherein the dynamic tag score represents a relativity between the dynamic tag and a dataset associated with the accessed dataset identifier, and wherein the dynamic tag score is used in an executed search to increase findability of the dataset In various embodiments, the system may calculate a normalized discounted cumulative gain (NDCG) score based on the dynamic tag score. The system may analyze the NDCG score to determine whether an effectiveness of the dynamic tag in improving the executed search for the dataset. The system may filter the dynamic tag based on at least one of the analyzing the NDCG score or the dynamic tag score. The system may associate the dynamic tag and the dynamic tag score with the dataset. The dataset may comprise an unstructured dataset. The system may preprocess the search term by separating the search term into a plurality of strings, removing a leading white space, removing a trailing white space, converting each character to an uppercase character, converting each character to a lowercase character, stemming the search term, and/or removing a stop word from the search term.

In various embodiments, the C parameter may be calculated to represent a popularity of the dataset based on the search term. The C parameter may be calculated based on a total number of times the dataset was accessed, a number of times the dataset was accessed based on the search term, a number of different users that accessed the dataset, a number of different datasets accessed during a search that generated the search log data, and/or a number of times the search term was used. The I parameter may be calculated to represent an importance of the search term in the dataset. The I parameter may be calculated using a term frequency inverse document frequency (e.g., TF-IDF) model. The T parameter may be calculated to represent a word, a phrase, or a topic relevant to the dataset in response to the search term not being present in a search. The step of calculating the dynamic tag score may also comprise weighting at least one of the C parameter, the I parameter, or the T parameter. The system may associate the dynamic tag and the dynamic tag score with the dataset, wherein the dynamic tag and the dynamic tag score are used in an executed search to increase a dataset findability of unstructured datasets.

In various embodiments, a method is disclosed. The method may comprise the steps of receiving a user search query comprising a search term; determining a dataset at least partially matching the search term, wherein the dataset comprises a dynamic tag associated with a dynamic tag score, wherein the dynamic tag matches the search term, and wherein the dynamic tag score is used in the user search query to increase findability of the dataset; calculating a search score for the dataset, wherein the search score is based on the dynamic tag score associated with the dynamic tag matching the search term; and generating a search result list comprising the dataset, wherein a list order of the search result list is determined based on the search score.

In various embodiments, the method may also comprise capturing search log data based on at least one of the user search query or the search result list, wherein the search log data comprises the search term and an accessed dataset identified associated with the dataset. The method may also comprise determining the dynamic tag based on the search term. The method may also comprise calculating a custom term weightage ("C") parameter, an important term weightage ("I") parameter, and/or a topic based weightage ("T") parameter for the dynamic tag. The method may also comprise calculating a second dynamic tag score based on at least one of the C parameter, the I parameter, or the T parameter, wherein the second dynamic tag score is different from the dynamic tag score. The method may also comprise updating the dynamic tag in the dataset by replacing the dynamic tag score with the second dynamic tag score.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

In various embodiments, a data indexing system using dynamic tags is disclosed. The dynamic tags may be configured to increase search findability and relativity of executed searches. In various embodiments, the dynamic tags may be used in datasets lacking defined attributes or tags such as, for example, unstructured datasets. In various embodiments, the dynamic tags may also be used in any dataset to improve search findability and relativity of executed searches including, for example, structured datasets and/or datasets having defined attributes and/or tags.

As discussed further herein, the dynamic tags may be generated based on an analysis of search logs. The search logs may capture user search data from the data indexing system, and the user search data may be used to determine various search factors such as, for example, how many times a particular dataset was accessed, how many times a particular dataset was accessed based on one or more search terms, how many different users accessed a particular dataset, how many different datasets a user accessed during a particular search, the most recent datasets that are being accessed based on a one or more search terms, how many times a particular search term is being used, etc. Based on the analyzed search log data, the system may calculate a dynamic tag score for various search terms. The dynamic tag score together with the associated search term (or phrase) may be stored with the dataset as the dynamic tag. In that regard, generation and assignment of dynamic tags to unstructured datasets or datasets having a lack of definite identification tags may provide a technical solution to the technical problems found in typical data indexing systems.

In various embodiments, the system further improves the functioning of the computer-based system. For example, by increasing findability and relativity in searches executed by the data indexing system, the data indexing system may receive less search resubmissions. Decreasing search resubmissions may increase computing efficiencies and decrease additional processing and memory consumption in comparison to typical data indexing systems. Further, the user may therefore perform less computer functions and provide less input, which saves on data storage and memory which speeds processing.

In various embodiments, computer processing time (e.g. the turnaround time for a search processing) in the system may be proportional to a number of searches being executed in the system. By increasing findability and relativity in searches executed by the data indexing system, the system may decrease the number of search submissions needed to reach desired datasets, thus optimizing system perform, reducing end user's time spent searching, and decreasing use of computer (or application) resources.

Figure 1:
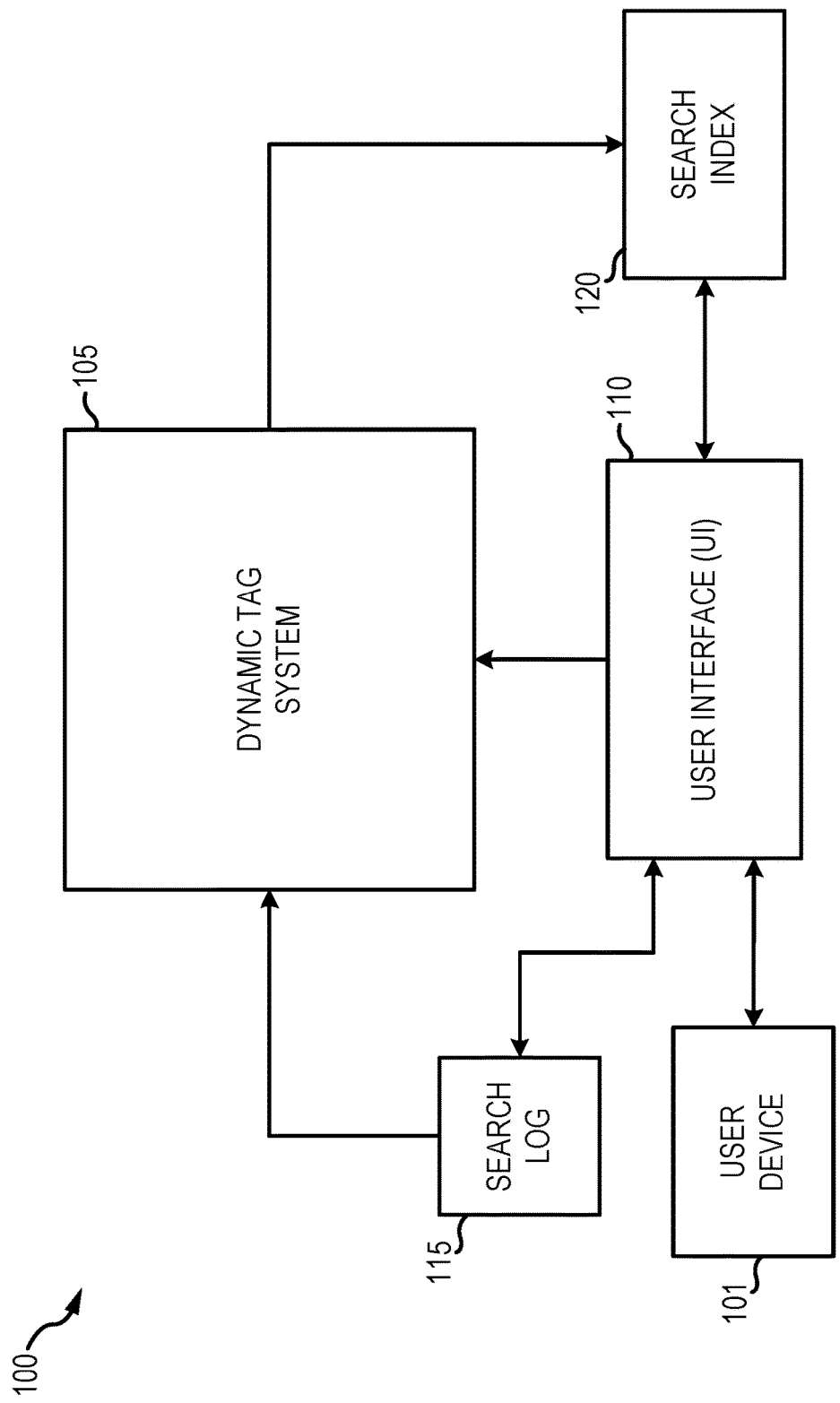
FIG. 1 is a block diagram illustrating various system components of a data indexing system, in accordance with various embodiments.

In various embodiments, and with reference to FIG. 1, a data indexing system 100 is disclosed (e.g., "system 100"). System 100 may comprise one or more of a user device 101, user interface (UI) 110, a search log, a search index 120, and/or a dynamic tag system 105. System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, a user may access user device 101 to interact with system 100, initiate and complete one or more user search queries, and/or the like, as discussed further herein. User device 101 may be in electronic communication with user interface (UI) 110. User device 101 may comprise any suitable hardware, software, and/or database components capable of transmitting, receiving, and storing data. For example, user device 101 may comprise a personal computer (e.g., desktop, laptop, etc.), personal digital assistant, cellular phone, smartphone (e.g., IPHONE®, BLACKBERRY®, etc.), IoT device, and/or the like. User device 101 may comprise an operating system such as, for example, a WINDOWS® mobile operating system, an ANDROID® operating system, APPLE® IOS®, a BLACKBERRY® operating system, a LINUX® operating system, and the like. User device 101 may also comprise software components installed on user device 101 and configured to allow via user device 101 access to various systems, services, and components in system 100. For example, user device 101 may comprise a web browser (e.g., MICROSOFT INTERNET EXPLORER®, GOOGLE CHROME®, etc.), an application, a micro-app or mobile application, or the like configured to allow user device 101 to access UI 110, and/or perform one or more user search queries via search index 120.

In various embodiments, UI 110 may be configured to provide an interface (e.g., a graphical user interface) for a user to interact with search index 120. For example, UI 110 may enable the user to input and execute user search queries via search index 120, review search results from search index 120, interact with search results from search index 120, and/or the like. UI 110 may be in electronic communication with user device 101, dynamic tag system 105, search log 115, and/or search index 120. UI 110 may include software modules, logic engines, various databases, and/or the like, configured to enable user access to search index 120. For example, UI 110 may be configured to provide a web-based interface for a user to access interact with search index 120.

In various embodiments, search index 120 may be in electronic communication with UI 110 and/or dynamic tag system 105. Search index 120 may be configured to provide a search interface to be used to execute a user search query and provide search results based on the user search query. For example, search index 120 may be configured to receive a user search query from UI 110. Search index 120 may be configured to execute the user search query on available datasets to locate and provide one or more search results (e.g., datasets that at least partially match the user search query). Search index 120 may be configured to provide the search results in an ordered list based on relativity to the user search query. As discussed further herein, search index 120 may be configured to apply logic based on dynamic tags to provide search results with increased findability and relativity (in comparison to search results provided by typical data indexing systems).

In various embodiments, search index 120 may be a standalone system separate from at least dynamic tag system 105. For example, search index 120 and dynamic tag system 105 may comprise separate systems. In that respect, and as discussed further herein, search index 120 may be configured to separately receive and execute user search queries, and dynamic tag system 105 may be configured to separately generate dynamic tags. In various embodiments, search index 120 may also be integrated into dynamic tag system 105 (and/or dynamic tag system 105 may be integrated search index 120). For example, search index 120 and dynamic tag system 105 may comprise the same system, virtual partitions of the same system, etc. In that respect, search index 120 collectively with dynamic tag system 105 may be configured to receive and execute user search queries, generate dynamic tags, and/or the like.

In various embodiments, search index 120 may comprise a database, data structure, or the like configured to store, maintain, and/or index datasets available for search in system 100. For example, the datasets may be stored in search index 120 to comprise various fields, tags, metadata, or the like, including, for example, a dataset ID, a title field, a content field, and/or a dynamic tags field. In various embodiments, search index 120 may be in electronic communication with a database, data structure, file system, or the like that stores and maintains datasets available for search in system 100. In that respect, search index 120 may comprise a frontend software interface configured to interact with the available datasets.

Search index 120 may comprise one or more hardware, software, and/or database components. For example, search index 120 may comprise one or more network environments, servers, computer-based systems, processors, databases, and/or the like. Search index 120 may comprise at least one computing device in the form of a computer or processor, or a set of computers/processors, although other types of computing units or systems may be used such as, for example, a server, web server, pooled servers, or the like. Search index 120 may also include software, such as services, APIs, and the like, configured to perform various operations discussed herein. In various embodiments, search index 120 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, search index 120 may comprise software, services, API's, and/or the like for use in searching, indexing, organizing, managing, processing, storing, retrieving, analyzing, and/or reporting information and data. For example, search index 120 may comprise the ELASTICSEARCH® search index engine provided by Elastic, APACHE® SOLR™ developed by the Apache Software Foundation, and/or any other suitable or desired search index engine.

In various embodiments, search log 115 may be in electronic communication with UI 110 and/or dynamic tag system 105. Search log 115 may be configured to capture or receive search log data from UI 110. The search log data may be captured or received based on any suitable user interaction with UI 110 and/or search index 120, such as, for example, in response to a user accessing UI 110 and/or search index 120, in response to a user transmitting or inputting a user search query, in response to the user receiving search results from search index 120, in response to the user interacting with one or more datasets from the search results, and/or the like. The search log data may comprise any suitable data, attributes, parameters, or the like logged in response to the user interacting with system 100. For example, the search log data may comprise a user identifier (e.g., user ID, username, etc.), a search timestamp (e.g., timestamp of the input and/or execution of a user search query), a search term (e.g., the search terms or phrases included in the user search query), an accessed dataset identifier (e.g., a dataset ID of a dataset accessed by the user), an accessed dataset timestamp (e.g., a timestamp of when the dataset was accessed by the user), and/or any other log data. In various embodiments, the search term may comprise a single term (e.g., "search"), a plurality of terms (e.g., "search system"), or a phrase (e.g., "What is a search system?").

Search log 115 may comprise a database, data structure, or the like configured to store and maintain the search log data. Search log 115 may also comprise any suitable hardware and/or software components configured to aid in capturing and storing the search log data.

In various embodiments, dynamic tag system 105 may be in electronic communication with search log 115 and/or search index 120. Dynamic tag system 105 may be configured to generate dynamic tags for use in datasets stored in search index 120. Dynamic tag system 105 may also be configured to generate a dynamic tag score associated with each dynamic tag. As discussed further herein, the dynamic tag score be calculated to represent the importance of the dynamic tag (e.g., the search term) in the associated dataset. In that regard, the dynamic tags and each associated dynamic tag score may be stored with associated datasets to increase findability and relativity of searches executed on the datasets.

Dynamic tag system 105 may comprise any suitable hardware, software, and/or database components. Dynamic tag system 105 may comprise one or more network environments, servers, computer-based systems, processors, databases, and/or the like. Dynamic tag system 105 may comprise at least one computing device in the form of a computer or processor, or a set of computers/processors, although other types of computing units or systems may be used such as, for example, a server, web server, pooled servers, or the like. Dynamic tag system 105 may also include software, such as services, APIs, and the like, configured to perform various operations discussed herein. In various embodiments, dynamic tag system 105 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Figure 2:
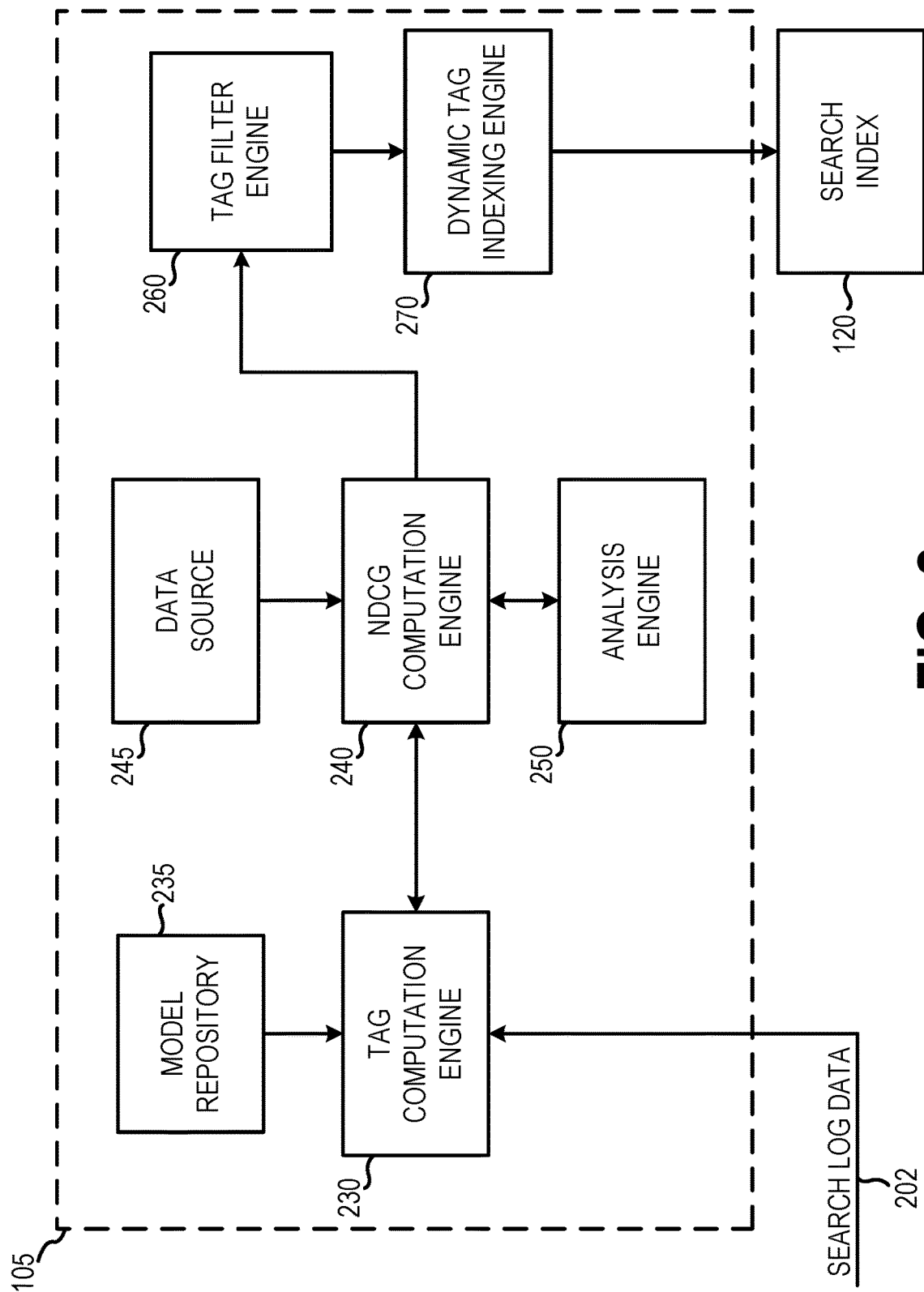
FIG. 2 is a block diagram illustrating various components of an exemplary dynamic tag system for a data indexing system, in accordance with various embodiments.

In various embodiments, dynamic tag system 105 may comprise various subsystems and components configured to aid in generating the dynamic tags. One or more of the subsystems and components may be implemented using any suitable combination of hardware, software, and/or database components. For example, in accordance with various embodiments and with reference to FIG. 2, dynamic tag system 105 may comprise a tag computation engine 230, a model repository 235, a normalized discounted cumulative gain (NDCG) computation engine 240, one or more data sources 245, an analysis engine 250, a tag filter engine 260, and/or a dynamic tag indexing engine 270.

In various embodiments, tag computation engine 230 may be configured to receive the search log data 202 from search log 115 (with brief reference to FIG. 1). Tag computation engine 230 may receive (or retrieve) the search log data 202 in real-time (e.g., as users execute user search queries on search index 120), as part of a batch process (e.g., once a day, week, etc.), and/or at any other desired time period. Tag computation engine 230 may be configured to perform various operations based on the search log data 202. For example, tag computation engine 230 may be configured to identify dynamic tags from the search terms in the search log data 202. For each identified dynamic tag, tag computation engine 230 may be configured to generate a dynamic tag score.

For example, and in accordance with various embodiments, tag computation engine 230 may be configured to preprocess the search terms from the search log data 202. Tag computation engine 230 may preprocess the search terms using any suitable process or technique. Tag computation engine 230 may apply natural language processing (NLP) to aid in preprocessing the search terms. For example, tag computation engine 230 may preprocess the search terms by separating the search terms into strings (e.g., strings separated by spaces or non-alphanumeric characters), removing a leading white space and/or a trailing white space, converting each character to an uppercase character or lowercase character, stemming the separated strings (e.g., reducing words to the root form), removing stop words, and/or via any other text or data preprocessing technique.

As a further example, and in accordance with various embodiments, tag computation engine 230 may be configured to calculate a custom term weightage ("C") parameter. The C parameter may be calculated based on the search log data. For example, the C parameter may be calculated based on a total number of times a given dataset (based on the dataset identifier) was accessed, a number of times a given dataset was accessed based on a search term, a number of different users (based on the user identifier) that accessed a given dataset, a number of different datasets (based on the dataset identifier) a particular user (based on the user identifier) accessed during a search, a most recent dataset (based on the dataset identifier) being accessed for a given search term (based on the search timestamp and/or the accessed dataset timestamp), the number of times a search term was used, and/or the like. In that regard, the C parameter may be calculated to represent the popularity of a dataset (e.g., how frequently the dataset is accessed, in total and based on a search term). In various embodiments, the C parameter may also include any other suitable or desired search-based parameter or analysis indicating the popularity of a given dataset based on a search term.

As a further example, and in accordance with various embodiments, tag computation engine 230 may be configured to calculate an important term weightage ("I") parameter. Tag computation engine 230 may calculate the I parameter for each search term (e.g., dynamic tag) from the search log data 202. For example, the I parameter may be calculated to represent the importance of the search term in the given dataset. Tag computation engine 230 may be configured to use any suitable process, model, or algorithm to calculate the I parameter. For example, tag computation engine 230 may implement a term frequency inverse document frequency (e.g., TF-IDF) model to calculate the I parameter. The TF-IDF model may output a value proportional to the number of times the search term appears in a given dataset.

In various embodiments, the TF-IDF model may also account for the total number of datasets comprising at least one (or a defined number) instance of the search term to adjust for the frequency of words being generally used in the datasets.

As a further example, and in accordance with various embodiments, tag computation engine 230 may be configured to calculate a topic based weightage ("T") parameter. The T parameter may be calculated to determine words, phrases, and/or topics that may be relevant to a dataset even if the search term is not present. For example, a search term of "sports" may be relevant to datasets comprising the terms "football" or "baseball." Similarly, a search term of "football" may also be relevant to datasets comprising the terms "soccer" or "sports."

In various embodiments, tag computation engine 230 may be configured to implement any suitable topic modelling process, model, or technique to aid in calculating the T parameter. For example, and in accordance with various embodiments, tag computation engine 230 may implement a machine learning model configured to calculate the T parameter. Tag computation engine 230 may implement any suitable machine learning model or algorithm, statistical data model, or the like, and may be supervised or unsupervised. For example, exemplary unsupervised models may include clustering and dimensionality reduction, LDA topic modeling, non-negative matrix factorization (NMF) topic modeling, and/or any other unsupervised machine learning model. For example, exemplary supervised models may include classification models, regression models, sentiment analysis techniques, and/or any other supervised machine learning model. The machine learning model may be trained to aid in identifying relevant terms and phrases, and to calculate the T parameter. For example, the machine learning model may receive as input the search log data 202, and/or any other suitable or desired data inputs, and may identify relevant terms and phrases and/or calculate the T parameter based on the input.

In various embodiments, the machine learning model may implement any suitable training and/or tuning parameters in topic modelling. The number of topics needed may depend on the data and the application. The chunksize of the machine learning model may control how many documents are processed at a time in the training algorithm. For example, increasing chunksize may speed up training in the machine learning model. Controlling the number of passes in the tuning parameters may control how often the machine learning model is trained. In various embodiments, the topic modelling for a dataset may be applied on the aggregated search terms associated with the dataset.

In various embodiments, machine learning networks and/or subject matter experts may initially supervise the model. In various embodiments, the machine learning model may comprise random forest models, gradient boosting models, or any other suitable or desired model. In various embodiments, the tag computation engine 230 may also implement reinforcement learning techniques to enhance the machine learning algorithm and/or statistical data models.

As a further example, and in accordance with various embodiments, tag computation engine 230 may be configured to calculate a dynamic tag score for each search term identified as a dynamic tag (e.g., a first dynamic tag is associated with first dynamic tag score, a second dynamic tag is associated with a second dynamic tag score, etc.). Each dynamic tag score may be configured to represent the relativity of the dynamic tag to the given dataset (e.g., the importance of the dynamic tag as being a key word or identifier in the given dataset, how reflective the dynamic tag is of the given dataset, etc.). Tag computation engine 230 may be configured to calculate the dynamic tag score based on the C parameter, the I parameter, and the T parameter. For example, the dynamic tag score may comprise a function of the C parameter, the I parameter, and the T parameter (e.g., DTS=C+I+T; DTS=CIT; DTS=CI+T; DTS=C+IT; DTS=CT+I; etc.). The dynamic tag score may comprise any suitable scale (e.g., 0.0-1.0, 1-100, etc.), wherein a high number corresponds to a dynamic tag having a high relativity to the given dataset.

In various embodiments, the dynamic tag score may be further tuned and optimized. For example, tag computation engine 230 may weight one or more of the parameters during the calculation of the dynamic tag score (e.g., $DTS=C_{weight}(C)+I_{weight}(I)+T_{weight}(T)$). Each parameter weight may comprise any suitable or desired value to influence how the associated parameter affects the dynamic tag score. In that respect, each parameter weight may be based on user input and may be changed as desired to influence the calculation of the dynamic tag score. Tag computation engine 230 may also tune and/or optimize the dynamic tag score using any other suitable or desired tuning or optimization process.

Model repository 235 may be configured to store and maintain various models, formulas, and/the like for use in calculating various parameters and scores by tag computation engine 230. For example, model repository 235 may store the TF-IDF model used to calculate the I parameter, the one or more machine learning models to calculate the T parameter, and/or any other algorithm, model, or the like needed to calculate the dynamic tag score and/or any of the parameters. Tag computation engine 230 may query or invoke model repository 235 to retrieve the needed algorithm, model, etc.

In various embodiments, data source 245 may be configured to store and maintain various desired search result sets. Each desired search result set may comprise a sample user search query and an optimum search result based on the same user search. In that regard, the desired search result sets may be used as a benchmark against the generated dynamic tags and dynamic tag scores to determine the effectiveness and accuracy of the dynamic tag score assigned each dynamic tag.

NDCG computation engine 240 may be configured to generate an NDCG score against the dynamic tag score generated by tag computation engine 230. NDCG computation engine 240 may implement standard NDCG techniques to generate the NDCG score. For example, NDCG computation engine 240 may ingest desired search result sets from data source 245. Using a graded relevance scale of sample datasets from the desired search result set, NDCG computation engine 240 may measure the usefulness or gain of a dataset based on its position in the result list compared to the desired search result set. For example, the usefulness or gain may be measured by placement of the dataset in the result list compared to the desired search result set (e.g., the position of the data set is accurately placed, is placed higher than in the desired search result set, is placed lower than in the desired search result set, etc.). In that respect, the NDCG score may be generated to measure or determine the effectiveness of the dynamic tag score in improving search results (based on a known search result set). For example, a higher NDCG score indicates effectiveness in the search strategy, and a lower NDCG score indicates that the search strategy is less effective.

In various embodiments, NDCG computation engine 240 may calculate multiple NDCG scores for different combinations of dynamic tags, to determine the effectiveness of each combination of dynamic tags in improving search results.

Analysis engine 250 may be configured to compare and analyze the NDCG scores to determine the dynamic tags (or set of dynamic tags) that most effectively improve the search results. Analysis engine 250 may analyze the NDCG scores using any suitable technique or process. For example, analysis engine 250 may be configured to implement any suitable topic modelling process, model, or technique to aid in comparing and analyzing the NDCG scores. Analysis engine 250 may use any machine learning model or technique described herein.

Tag filter engine 260 may be configured to filter the dynamic tags. In various embodiments, tag filter engine 260 may be configured to filter the dynamic tags based on the analysis completed by analysis engine 250. For example, in response to analysis engine 250 determining that an NDCG score for a dynamic tag indicates that the dynamic tag does not improve search results, tag filter engine 260 may be configured to delete the dynamic tag, and/or otherwise proceed without including the dynamic tag. In response to analysis engine 250 determining that an NDCG score for a dynamic tag indicates that the dynamic tag improves search results, tag filter engine 260 may be configured to transmit the (filtered) dynamic tag to dynamic tag indexing engine 270.

In various embodiments, tag filter engine 260 may also be configured to filter the dynamic tags based on dynamic tag scores. For example, tag filter engine 260 may comprise a score filtering threshold (e.g., 0.5, 50, etc.) that represents a minimum dynamic tag score acceptable to be used in the system. The score filtering threshold may comprise any suitable or desired value, and may be adjusted or optimized based on searching needs. In response to the dynamic tag score being less than the score filtering threshold, tag filter engine 260 may be configured to delete the dynamic tag, and/or otherwise proceed without including the dynamic tag. In response to the dynamic tag score being equal to or greater than the score filtering threshold, tag filter engine 260 may be configured to transmit the (filtered) dynamic tag to dynamic tag indexing engine 270.

Dynamic tag indexing engine 270 may be configured to update datasets in search index 120 to include the filtered dynamic tags and/or dynamic tag scores. For example, dynamic tag indexing engine 270 may query search index 120 (based on the dataset identifier) to retrieve the dataset. Dynamic tag indexing engine 270 may edit the dataset to include or associate the dynamic tag and the dynamic tag score (e.g., as a tag, metadata, note, field, etc.). In response to the dataset already comprising the dynamic tag, dynamic tag indexing engine 270 may update the dynamic tag score (in response to the dynamic tag score being different than the stored dynamic tag score). Dynamic tag indexing engine 270 may transmit the updated dataset to search index 120 for storage.

Figure 3:
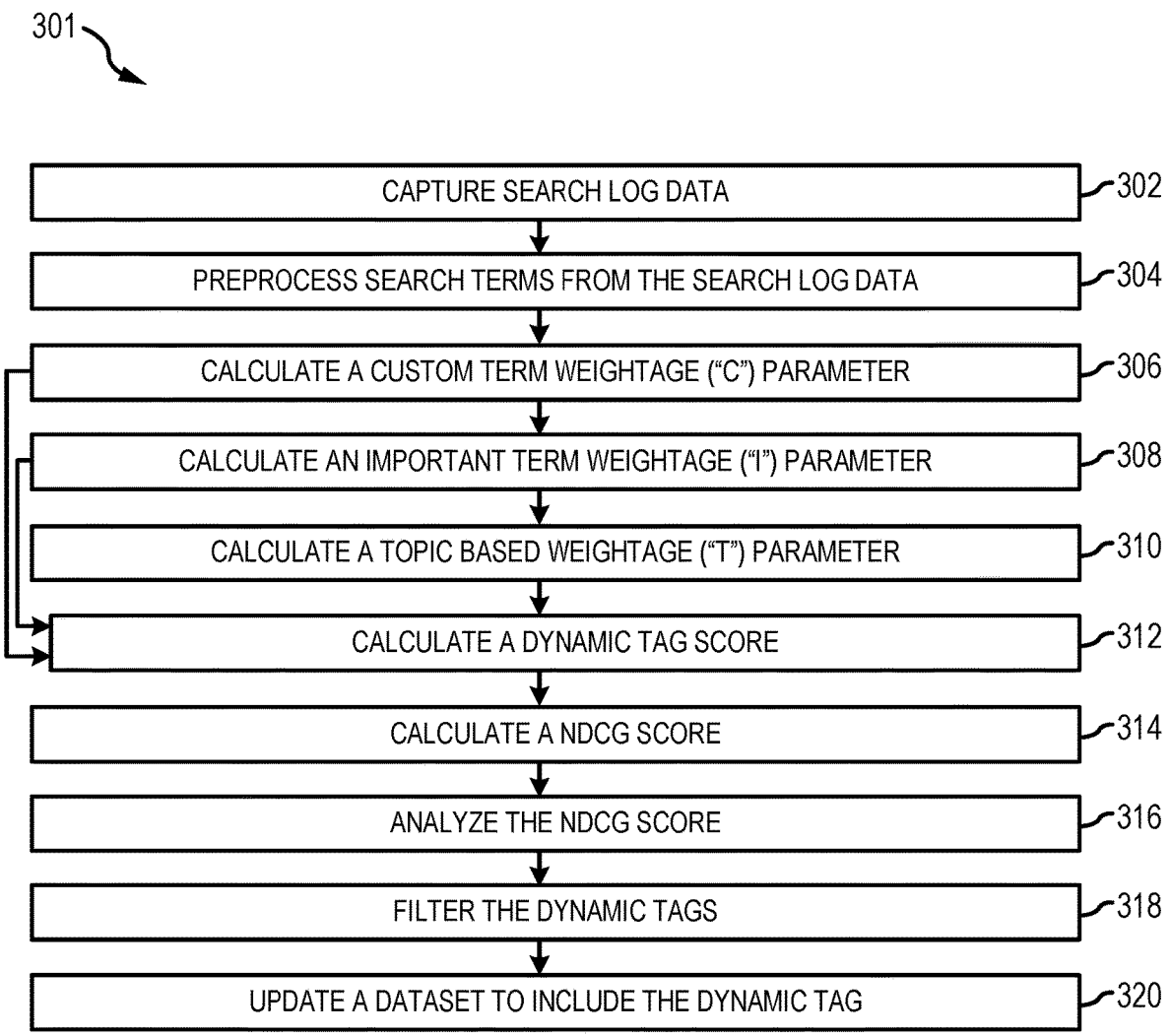
FIG. 3 illustrates a process flow for a method of generating a dynamic tag, in accordance with various embodiments.
Figure 4:
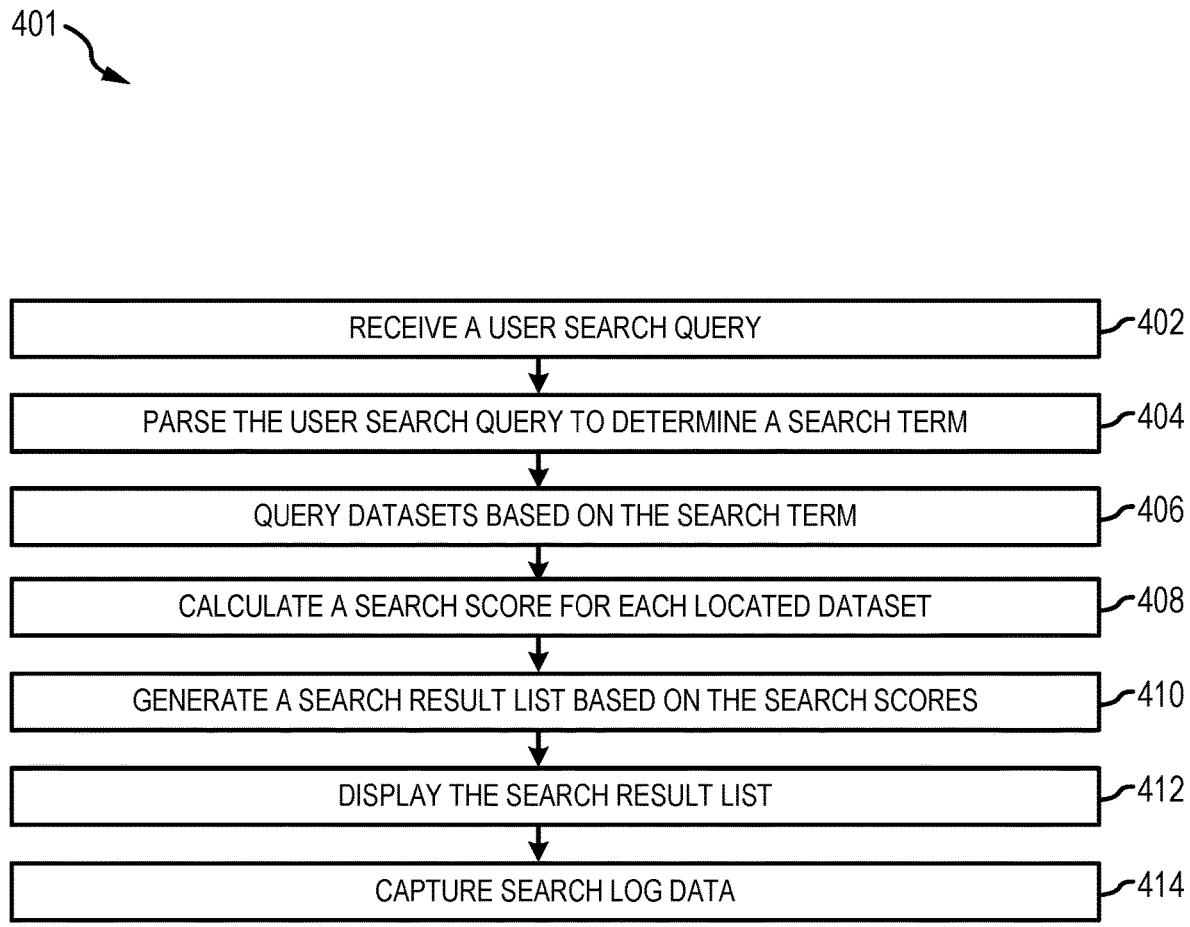
FIG. 4 illustrates a process flow for a method of performing a search in a data indexing system using dynamic tags, in accordance with various embodiments.

Referring now to FIGS. 3 and 4 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3 and 4, but also to the various system components as described above with reference to FIGS. 1 and 2. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

With specific reference to FIG. 3, and in accordance with various embodiments, a method 301 for generating a dynamic tag for use in a data indexing system is disclosed. Method 301 may comprise capturing search log data (step 302). Search log 115 may be configured to capture the search log data 202 from UI 110 and/or search index 120. The search log data 202 may be captured or received based on any suitable user interaction with UI 110 and/or search index 120, such as, for example, in response to a user accessing UI 110 and/or search index 120, in response to a user transmitting or inputting a user search query, in response to the user receiving search results from search index 120, in response to the user interacting with one or more datasets from the search results, and/or the like. The search log data may comprise any suitable data, attributes, parameters, or the like logged in response to the user interacting with UI 110 and/or search index 120, such as, for example, a user identifier (e.g., user ID, username, etc.), a search timestamp (e.g., timestamp of the input and/or execution of a user search query), a search term (e.g., the search terms or phrases included in the user search query), an accessed dataset identifier (e.g., a dataset ID of a dataset accessed by the user), an accessed dataset timestamp (e.g., a timestamp of when the dataset was accessed by the user), and/or any other log data.

Tag computation engine 230 may be configured to retrieve the search log data 202 from search log 115. Tag computation engine 230 may retrieve the search log data 202 in real-time (e.g., as users execute user search queries on search index 120), as part of a batch process (e.g., once a day, week, etc.), and/or at any other desired time period.

Method 301 may comprise preprocessing a search term form the search log data (step 304). Tag computation engine 230 may be configured to preprocess the search log data 202. For example, tag computation engine 230 may be configured to parse the search log data 202 to determine the search terms from the search log data 202. In response to locating the search terms, tag computation engine 230 may perform various preprocessing operations, such as, for each, by separating the search terms into strings (e.g., strings separated by spaces or non-alphanumeric characters), removing a leading white space and/or a trailing white space, converting each character to an uppercase character or lowercase character, stemming the separated strings (e.g., reducing words to the root form), removing stop words, and/or via any other text or data preprocessing technique. In response to preprocessing the search terms, tag computation engine 230 may generate a dynamic tag for each search term.

Method 301 may comprise calculating a custom term weightage ("C") parameter (step 306). For example, in response to generating the dynamic tags, tag computation engine 230 may be configured to generate the C parameter. The C parameter may be calculated based on the search log data 202, and may be calculated for each identified dynamic tag. For example, the C parameter may be calculated based on a total number of times a given dataset (based on the dataset identifier) was accessed, a number of times a given dataset was accessed based on a search term, a number of different users (based on the user identifier) that accessed a given dataset, a number of different datasets (based on the dataset identifier) a particular user (based on the user identifier) accessed during a search, a most recent dataset (based on the dataset identifier) being accessed for a given search term (based on the search timestamp and/or the accessed dataset timestamp), the number of times a search term was used, and/or the like. In that regard, the C parameter may be calculated to represent the popularity of a dataset based on a search term. In various embodiments, the C parameter may also include any other suitable or desired search-based parameter or analysis indicating the popularity of a given dataset based on a search term.

Method 301 may comprise calculating an important term weightage ("I") parameter (step 308). For example, in response to generating the dynamic tags tag computation engine 230 may be configured to generate the I parameter. Tag computation engine 230 may calculate the I parameter for each identified dynamic tag. Tag computation engine 230 may be configured to use any suitable process, model, or algorithm to calculate the I parameter. For example, tag computation engine 230 may implement a term frequency inverse document frequency (e.g., TF-IDF) model to calculate the I parameter. Tag computation engine 230 may retrieve the TF-IDF model from model repository 235. The TF-IDF model may output a value that increases proportionally to the number of times the search term appears in a given dataset. In various embodiments, the TF-IDF model may also account for the total number of datasets comprising at least one (or a defined number) instance of the search term to adjust for the frequency of words being generally used in the datasets.

Method 301 may comprise calculating a topic based weightage ("T") parameter (step 310). For example, in response to generating the dynamic tags tag computation engine 230 may be configured to generate the T parameter. The T parameter may be calculated to determine words, phrases, and/or topics that may be relevant to a dataset even if the search term is not present. Tag computation engine 230 may generate the T parameter for each identified dynamic tag. Tag computation engine 230 may be configured to implement any suitable topic modelling process, model, or technique to aid in calculating the T parameter. For example, and in accordance with various embodiments, tag computation engine 230 may implement a machine learning model configured to calculate the T parameter. For example, the machine learning model may receive as input the search log data 202, the dynamic tags, and/or any other suitable or desired data inputs, and may identify relevant terms and phrases and/or calculate the T parameter based on the input.

Method 301 may comprise calculating a dynamic tag score (step 312) based on one or more of the C parameter, the I parameter, and/or the T parameter. Tag computation engine 230 may be configured to calculate a dynamic tag score for each identified dynamic tag, in response to calculating one or more of the C parameter, the I parameter, and/or the T parameter. Each dynamic tag score may be configured to represent the relativity of the dynamic tag to the given dataset (e.g., the importance of the dynamic tag as being a key word or identifier in the given dataset). For example, the dynamic tag score may comprise a function of the C parameter, the I parameter, and the T parameter (e.g., DTS=C+I+T; DTS=CIT; DTS=CI+T; DTS=C+IT; DTS=CT+I; etc.). The dynamic tag score may comprise any suitable scale (e.g., 0.0-1.0, 1-100, etc.), wherein a high number corresponds to a dynamic tag having a high relativity to the given dataset and a low number corresponds to a dynamic tag having a low relativity to the given dataset.

In various embodiments, the dynamic tag score may be further tuned and optimized. For example, tag computation engine 230 may weight one or more of the parameters during the calculation of the dynamic tag score (e.g., $DTS=C_{weight}(C)+I_{weight}(I)+T_{weight}(T)$). Each parameter weight may comprise any suitable or desired value to influence how the associated parameter affects the dynamic tag score. Tag computation engine 230 may also tune and/or optimize the dynamic tag score using any other suitable or desired tuning or optimization process.

In response to calculating the dynamic tag score for one or more dynamic tags, tag computation engine 230 may be configured to transmit the dynamic tag and the dynamic tag score to NDCG computation engine 240.

Method 301 may comprise calculating an NDCG score (step 314). NDCG computation engine 240 may be configured to calculate the NDCG score in response to receiving a dynamic tag and dynamic tag score. NDCG computation engine 240 may calculate an NDCG score for each received dynamic tag having a dynamic tag score. NDCG computation engine 240 may implement standard NDCG techniques to generate the NDCG score. For example, NDCG computation engine 240 may ingest desired search result sets from data source 245. Using a graded relevance scale of sample datasets from the desired search result set, NDCG computation engine 240 may measure the usefulness or gain of a dataset based on its position in the result list compared to the desired search result set. In that respect, the NDCG score may be generated to measure or determine the effectiveness of the dynamic tag score in improving search results (based on a known search result set). In various embodiments, NDCG computation engine 240 may calculate multiple NDCG scores for different combinations of dynamic tags, to determine the effectiveness of each combination of dynamic tags in improving search results for a given dataset.

In various embodiments, in response to calculating one or more NDCG scores, NDCG computation engine 240 may be configured to transmit the calculated NDCG scores, the dynamic tag, and/or the associated dynamic tag score to analysis engine 250.

Method 301 may comprise analyzing the NDCG score (step 316). Analysis engine 250 may be configured to analyze the NDCG score in response to receiving the NDCG scores, the dynamic tag, and/or the associated dynamic tag score from NDCG computation engine 240. Analysis engine 250 may be configured to compare and analyze the NDCG scores to determine the dynamic tags (or set of dynamic tags) that most effectively improve the search results. Analysis engine 250 may analyze the NDCG scores using any suitable technique or process. For example, analysis engine 250 may be configured to implement any suitable topic modelling process, model, or technique to aid in comparing and analyzing the NDCG scores. Analysis engine 250 may use any machine learning model or technique described herein.

In response to completing the analysis, analysis engine 250 may transmit an analysis output, the NDCG scores, the dynamic tag, and/or the associated dynamic tag score to tag filter engine 260 (e.g., directly or via NDCG computation engine 240).

Method 301 may comprise filtering the dynamic tag (step 318). Tag filter engine 260 may be configured to filter the dynamic tags in response to receiving one or more of the analysis output, the calculated NDCG scores, the dynamic tag, and/or the associated dynamic tag score. In various embodiments, tag filter engine 260 may be configured to filter the dynamic tags based on the analysis output received from analysis engine 250. For example, in response to analysis engine 250 determining that an NDCG score for a dynamic tag indicates that the dynamic tag does not improve search results, tag filter engine 260 may be configured to delete the dynamic tag, and/or otherwise proceed without including the dynamic tag. In response to analysis engine 250 determining that an NDCG score for a dynamic tag indicates that the dynamic tag improves search results, tag filter engine 260 may be configured to transmit the (filtered) dynamic tag to dynamic tag indexing engine 270.

In various embodiments, tag filter engine 260 may also be configured to filter the dynamic tags based on the dynamic tag scores. For example, tag filter engine 260 may comprise a score filtering threshold (e.g., 0.5, 50, etc.) that represents a minimum dynamic tag score acceptable to be used in the system. The score filtering threshold may comprise any suitable or desired value, and may be adjusted or optimized based on searching needs. In response to the dynamic tag score being less than the score filtering threshold, tag filter engine 260 may be configured to delete the dynamic tag, and/or otherwise proceed without including the dynamic tag. In response to the dynamic tag score being equal to or greater than the score filtering threshold, tag filter engine 260 may be configured to transmit the (filtered) dynamic tag to dynamic tag indexing engine 270.

Method 301 may comprise updating a dataset to include the dynamic tag (step 320). Dynamic tag indexing engine 270 may be configured to update datasets in response to receiving dynamic tags and/or dynamic tag scores from dynamic tag indexing engine 270. Dynamic tag indexing engine 270 may be configured to update datasets in search index 120 to include the filtered dynamic tags and/or dynamic tag scores. For example, dynamic tag indexing engine 270 may query search index 120 (based on the dataset identifier) to retrieve the dataset. Dynamic tag indexing engine 270 may edit the dataset to include or associate the dynamic tag and the dynamic tag score (e.g., as a tag, metadata, note, field, etc.). In response to the dataset already comprising the dynamic tag, dynamic tag indexing engine 270 may update the dynamic tag score (in response to the dynamic tag score being different than the stored dynamic tag score). Dynamic tag indexing engine 270 may transmit the updated dataset to search index 120 for storage.

With specific reference to FIG. 4, and in accordance with various embodiments, a method 401 for performing a search in a data indexing system using dynamic tags is disclosed.

Method 401 may comprise receiving a user search query (step 402). For example, user device 101, via UI 110, may submit a user search query to search index 120. In various embodiments, the user search query may be structured or unstructured. The user search query may include Boolean Operators. The user search query may comprise one or more search terms (e.g., "user search," "a user search," "user+ search," "user AND search," etc.). The user search query may be input using any suitable technique (e.g., text, voice, etc.).

In various embodiments, UI 110 may require the user, via user device 101, to perform an authentication before being granted access to search index 120. For example, the authentication may comprise a username and password input, biometric input, a two-factor authentication, and/or any other suitable authentication mechanism. UI 110 may be configured to verify the authentication using any suitable authentication verification process. In that regard, the user and the user search query may be associated with a user identifier and may comprise permissions controlling datasets or actions accessible via search index 120.

Method 401 may comprise parsing the user search query to determine the search terms (step 404). Search index 120 may parse the user search query using any suitable technique. For example, search index 120 may parse the user search query to locate each string separated by a space or nonalphanumeric character. Each identified string may be determined as a search term.

Method 401 may comprise querying datasets based on the search terms (step 406). Search index 120 may be configured to query the datasets in response to determining the search terms. Search index 120 may be configured to query the datasets available in search index 120 using any suitable querying process to locate datasets that at least partially match one or more of the search terms. For example, search index 120 may query the title field, the content field, and/or the dynamic tags field to locate datasets that at least partially match or more of the search terms.

Method 401 may comprise calculating a search score for each located dataset (step 408). In response to locating at least one dataset, search index 120 may be configured to calculate a search score for each located dataset. For example, search index 120 may be configured to match the search terms with the dynamic tags associated with the dataset. In response to matching with a dynamic tag, search index 120 may retrieve the dynamic tag score associated with the dynamic tag. Search index 120 may calculate the search score by combining the dynamic tag scores for each matched dynamic tag in a given dataset.

As an example, in response to the search terms comprising "user," "dynamic," and "search," search index 120 may query the dynamic tag field of each located dataset to attempt to match the search terms with the associated dynamic tags. In response to search index 120 being unable to locate any matching dynamic tags in a first dataset 1, the search score for the first dataset 1 may be calculated as 0, or another minimum score number. In response to search index 120 locating in a second dataset 2 a match of only a "user" dynamic tag, with the "user" dynamic tag having a dynamic tag score of 5, the search score for the second dataset 2 may be calculated as 5. In response to search index 120 locating in a third dataset 3 a match of a "user" dynamic tag and a "dynamic" dynamic tag, with the "user" dynamic tag having a dynamic tag score of 3 and the "dynamic" dynamic tag having a dynamic tag score of 5, the search score for the third dataset 3 may be calculated as 8. In response to search index 120 locating in a fourth dataset 4 a match of a "user" dynamic tag, a "dynamic" dynamic tag, and a "search" dynamic tag, with the "user" dynamic tag having a dynamic tag score of 0.5, the "dynamic" dynamic tag having a dynamic tag score of 1, and the "search" dynamic tag having a dynamic tag score of 2, the search score for the fourth dataset 4 may be calculated as 3.5.

Method 401 may comprise generating a search result list based on the search scores (step 410). In response to generating a search score for each located dataset, search index 120 may be configured to generating the search result list. The search result list may comprise each located dataset. The search result list may be generated according to a search result list order. The search result list order may be based on search score, and may comprise a descending order such that the located dataset having the highest search score is displayed first. In that respect, search index 120 may generate the search result list by ordering each located dataset based on search score.

For example, given the above example of a query including the search terms "user," "dynamic," and "search," the generated search result list may comprise third dataset 3 (search score of 8) ranked first, second dataset 2 (search score of 5) ranked second, fourth dataset 4 (search score of 3.5) ranked third, and first dataset 1 (search score of 0) ranked last.

Method 401 may comprise displaying the search result list (step 412). Search index 120, via UI 110, may be configured to display the search result list. For example, search index 120, via UI 110, may display the dataset title for each located dataset in the search result list, or may display any other suitable identifier or text. In that regard, the user, via user device 101 and UI 110, may interact with the search result list to view various datasets in the search result list.

In various embodiments, method 401 may comprise capturing search log data (step 414). Search log 115 may be configured to capture the search log data 202 during one or more steps of method 401. For example, search log 115 may be configured to capture the search log data 202 in response to a user accessing UI 110 and/or search index 120, in response to a user transmitting or inputting a user search query, in response to the user receiving search results from search index 120, in response to the user interacting with one or more datasets from the search results, and/or the like. The search log data may comprise any suitable data, attributes, parameters, or the like logged in response to the user interactions. For example, the search log data may comprise a user identifier (e.g., user ID, username, etc.), a search timestamp (e.g., timestamp of the input and/or execution of a user search query), a search term (e.g., the search terms or phrases included in the user search query), an accessed dataset identifier (e.g., a dataset ID of a dataset accessed by the user), an accessed dataset timestamp (e.g., a timestamp of when the dataset was accessed by the user), and/or any other log data.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of the system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS' applications but have been combined for simplicity.

In various embodiments, components, modules, and/or engines of system 100, or one or more subcomponents of system 100, may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In various embodiments, one or more servers discussed herein may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIBUTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled SYSTEM AND METHOD FOR TRANSACTION ACCOUNT BASED MICRO-PAYMENTS and filed on Jul. 31, 2018, U.S. application Ser. No. 16/052,416 titled PROCUREMENT SYSTEM USING BLOCKCHAIN and filed on Aug. 1, 2018, U.S. application Ser. No. 16/054,185 titled BLOCKCHAIN-ENABLED DATASETS SHARED ACROSS DIFFERENT DATABASE SYSTEMS and filed on Aug. 3, 2018, U.S. application Ser. No. 16/168,477 titled MULTI-MERCHANT LOYALTY POINT PARTNERSHIP and filed on Oct. 23, 2018, U.S. application Ser. No. 16/217,654 titled PEER-TO-PEER CONFIDENTIAL DOCUMENT EXCHANGE and filed on Dec. 12, 2018, U.S. application Ser. No. 16/217,734 titled ZERO-KNOWLEDGE PROOF PAYMENTS USING BLOCKCHAIN and filed on Dec. 12, 2018, U.S. application Ser. No. 16/220,235 titled TRANSACTION ACCOUNT DATA MAINTENANCE USING BLOCKCHAIN and filed on Dec. 14, 2018, and U.S. application Ser. No. 16/239,017 titled HYBRID IDENTITY AS A SERVICE FOR DECENTRALIZED BROWSER BASED WALLET and filed on Jan. 3, 2019, the contents of which are each incorporated by reference in its entirety Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption of data in system 100, including in one or more databases, may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multi-threaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nutjten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    capturing, by a processor, search log data comprising a search term and an accessed dataset identifier;
    determining, by the processor, a dynamic tag based at least in part on preprocessing the search term from the search log data, wherein preprocessing the search term further comprises at least one of: separating the search term into a plurality of strings, removing a leading white space, removing a trailing white space, converting each character to an uppercase character, converting each character to a lowercase character, stemming the search term, or removing a stop word from the search term;
    calculating, by the processor, a custom term weightage ("C") parameter representing a popularity of a dataset associated with the accessed dataset identifier, an important term weightage ("I") parameter representing an importance of the search term in the dataset that is proportional to a frequency of appearance of the search term in the dataset, and a topic based weightage ("T") parameter for the dynamic tag, the T parameter representing a word, a phrase, or a topic relevant to the dataset but not present in the dataset, wherein the C parameter, the I parameter, and the T parameter are calculated based at least in part on the search log data; and calculating, by the processor, a dynamic tag score as a function of the C parameter, the I parameter, and the T parameter, wherein the dynamic tag score represents a relativity between the dynamic tag and the dataset, and wherein the dynamic tag score is used in an executed search to increase findability of the dataset.

2. The method of claim 1, further comprising calculating, by the processor, a normalized discounted cumulative gain (NDCG) score based at least in part on the dynamic tag score.

3. The method of claim 2, further comprising analyzing, by the processor, the NDCG score to determine an effectiveness of the dynamic tag in improving the executed search for the dataset.

4. The method of claim 3, further comprising filtering, by the processor, the dynamic tag based at least in part on at least one of the analyzing the NDCG score or the dynamic tag score.

5. The method of claim 4, further comprising associating, by the processor, the dynamic tag and the dynamic tag score with the dataset.

6. The method of claim 1, wherein the dataset comprises an unstructured dataset.

7. A system comprising:
a processor; and
a tangible, non-transitory memory configured to communicate with the processor, the tangible, non-transitory memory having instructions stored thereon that, in response to execution by the processor, cause the processor to perform operations comprising:
capturing, by the processor, search log data comprising a search term and an accessed dataset identifier;
determining, by the processor, a dynamic tag based at least in part on preprocessing the search term from the search log data, wherein preprocessing the search term further comprises at least one of: separating the search term into a plurality of strings, removing a leading white space, removing a trailing white space, converting each character to an uppercase character, converting each character to a lowercase character, stemming the search term, or removing a stop word from the search term;
calculating, by the processor, a custom term weightage ("C") parameter representing a popularity of a dataset associated with the accessed dataset identifier, an important term weightage ("I") parameter representing an importance of the search term in the dataset that is proportional to a frequency of appearance of the search term in the dataset, and a topic based weightage ("T") parameter for the dynamic tag, the T parameter representing a word, a phrase, or a topic relevant to the dataset but not present in the dataset, wherein the C parameter, the I parameter, and the T parameter are calculated based at least in part on the search log data; and
calculating, by the processor, a dynamic tag score as a function of the C parameter, the I parameter, and the T parameter, wherein the dynamic tag score represents a relativity between the dynamic tag and the dataset, and wherein the dynamic tag score is used in an executed search to increase findability of the dataset.

8. The system of claim 7, wherein the popularity of the dataset is based at least in part on the search term.

9. The system of claim 7, wherein the C parameter is calculated based at least in part on at least one of a total number of times the dataset was accessed, a number of times the dataset was accessed based at least in part on the search term, a number of different users that accessed the dataset, a number of different datasets accessed during a search that generated the search log data, or a number of times the search term was used.

10. The system of claim 7, wherein the I parameter is calculated using a term frequency inverse document frequency (TF-IDF) model.

11. The system of claim 7, wherein the T parameter is calculated in response to the search term not being present in a search.

12. The system of claim 7, wherein the calculating the dynamic tag score further comprises weighting at least one of the C parameter, the I parameter, or the T parameter.

13. The system of claim 7, further comprising associating, by the processor, the dynamic tag and the dynamic tag score with the dataset.

14. A method comprising:
receiving, by a computer-based system, a user search query comprising a search term;
determining, by the computer-based system, a dataset at least partially matching the search term, wherein the dataset comprises a dynamic tag, wherein the dynamic tag matches the search term;
calculating, by the computer-based system, a dynamic tag score for the dynamic tag as a function of a custom term weightage ("C") parameter representing a popularity of the dataset, an important term weightage ("I") parameter representing an importance of the search term in the dataset that is proportional to a frequency of appearance of the search term in the dataset, and a topic based weightage ("T") parameter for the dynamic tag, the T parameter representing a word, a phrase, or a topic relevant to the dataset but not present in the dataset, wherein the dynamic tag score is used in determining the dataset to increase findability of the dataset;
calculating, by the computer-based system, a search score for the dataset, wherein the search score is based at least in part on the dynamic tag score associated with the dynamic tag matching the search term; and
generating, by the computer-based system, a search result list comprising the dataset, wherein a list order of the search result list is determined based at least in part on the search score.

15. The method of claim 14, further comprising capturing, by the computer-based system, search log data based at least in part on at least one of the user search query or the search result list, wherein the search log data comprises the search term and an accessed dataset identified associated with the dataset.

16. The method of claim 15, further comprising determining, by the computer-based system, the dynamic tag based at least in part on the search term.

17. The method of claim 14, further comprising calculating, by the computer-based system, a second dynamic tag score based at least in part on at least one of the C parameter, the I parameter, or the T parameter, wherein the second dynamic tag score is different from the dynamic tag score.

18. The method of claim 17, further comprising updating, by the computer-based system, the dynamic tag in the dataset by replacing the dynamic tag score with the second dynamic tag score.

19. The method of claim 14, further comprising:
calculating, by the computer-based system, the C parameter based at least in part on at least one of a total number of times the dataset was accessed, a number of times the dataset was accessed based at least in part on the search term, a number of different users that accessed the dataset, a number of different datasets accessed during a search, or a number of times the search term was used;

calculating, by the computer-based system, the I parameter using a term frequency inverse document frequency (TF-IDF) model; and calculating, by the computer-based system, the T parameter in response to the search term not being present in the search.

20. The method of claim 1, wherein preprocessing the search term further comprises applying natural language processing to the search term.

* * * * *